(No Model.)
M. A. GAUGH.
WASH DISH PAN AND DRAINER.
No. 431,943. Patented July 8, 1890.
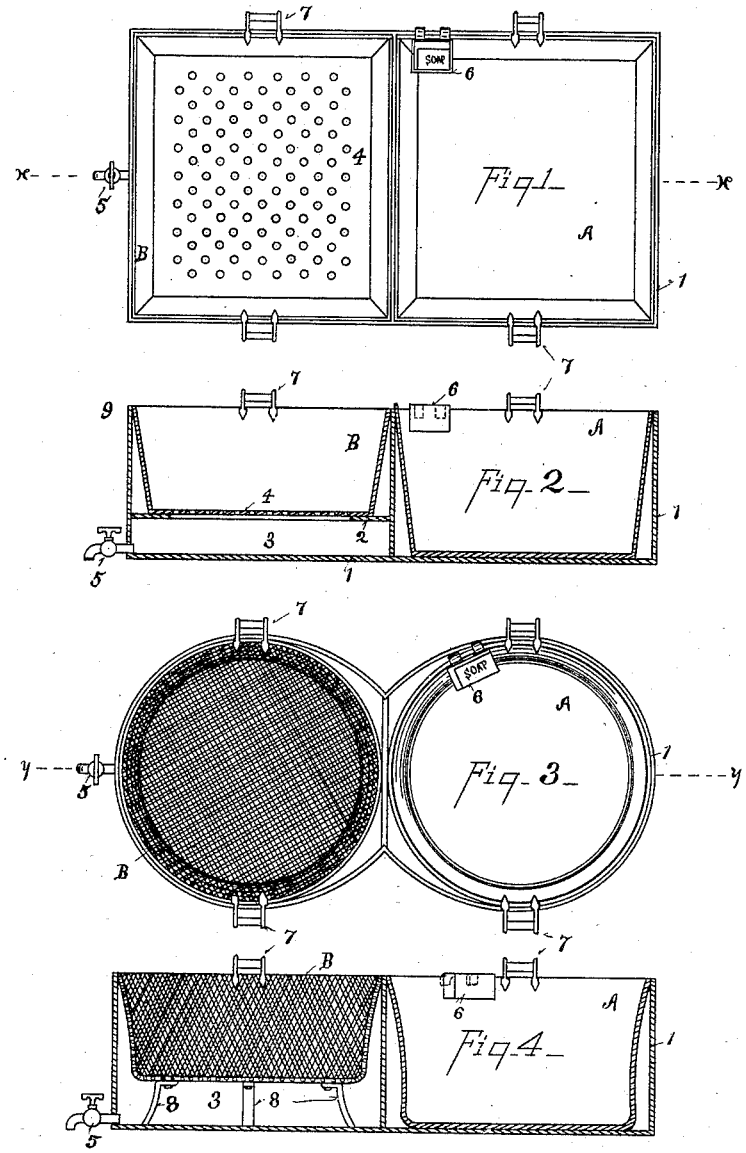
Witnesses
C. W. Mils
T. Simmons
Inventor
Maria A. Gaugh
By Her Attorneys Wood & Boyd

UNITED STATES PATENT OFFICE.

MARIA A. GAUGH, OF NEWPORT, KENTUCKY.

WASH DISH PAN AND DRAINER.

SPECIFICATION forming part of Letters Patent No. 431,943, dated July 8, 1890.

Application filed November 26, 1889. Serial No. 331,605. (No model.)

*To all whom it may concern:*

Be it known that I, MARIA A. GAUGH, a citizen of the United States, and a resident of Newport, in the county of Campbell and State of Kentucky, have invented certain new and useful Improvements in Wash Dish Pans and Drainers, of which the following is a specification.

My invention consists of a combined dish washing pan and drainer supported in the same tray, the various features of which will be fully set forth in the description of the accompanying drawings, making a part of this specification, in which—

Figure 1 is a top plan view of one form of my invention. Fig. 2 is a section on line $x\,x$, Fig. 1. Fig. 3 is a modification of the form shown in Fig. 1, and Fig. 4 is a section on line $y\,y$, Fig. 3.

The object of my invention is to provide a receptacle for a draining and wash pan, which set in it side by side and so close that the drippings from the plate will be caught by the receptacle as the dishes are removed from the wash-pan and drainer. Both are made detachable from the tray or receptacle. The drainer containing the wet dishes may be carried to any convenient place for depositing the same, and the water drained from the dishes is caught in the reservoir and may be drained off from the reservoir.

1 represents a common receptacle for a tray, in which the wash-pan A and the drainer B are placed. The wash-pan A rests upon the bottom of the receptacle 1. The drainer B is preferably supported upon ledges 2, so as to form a reservoir or space 3 underneath to hold the water which drains from the dishes.

When made of sheet metal, as shown in Figs. 1 and 2, the drainer is provided with a perforated bottom 4, through which the water passes down into the reservoir 3.

5 represents a cock for draining off the water.

6 represents a detachable soap-box connected to the wash-pan.

In Figs. 3 and 4 I have shown a modification of the shape of the tray, wash-pan, and drainer, which are made round, the latter being made of wire and supported upon legs 8.

7 represents handles on the pans, so that they may be readily taken out.

The advantage gained in having the two dishes contained in one tray or receptacle is such that all the drippings from the plates are caught in the receiving-tray, and at the same time the dishes which are washed and placed in the drainer B can be readily rinsed and without rehandling drained and conveyed to the china-closet, where a very slight amount of wiping is required to dry them.

The ledge 2 is not essential, as the drainer may be supported upon the top rim 9, as shown in Fig. 1.

This device is very cheap, convenient, compact, and allows the dishes to be readily rinsed without a second handling.

Having described my invention, what I claim is—

A pan for washing and draining dishes, consisting of the outer receptacle 1, divided centrally by a partition, the removable wash-pan A, situated in one compartment, and the perforated removable drainer B, situated in the opposite compartment, substantially as described.

In testimony whereof I have hereunto set my hand.

MARIA A. GAUGH.

Witnesses:
EDWARD BOYD,
T. SIMMONS.